United States Patent [19]

Bertling

[11] 4,153,024
[45] May 8, 1979

[54] DEVICE FOR INFLUENCING THE COMPOSITION OF THE OPERATING MIXTURE SUPPLIED TO AN INTERNAL COMBUSTION ENGINE

[75] Inventor: Johannes-Gerhard Bertling, Vaihingen, Fed. Rep. of Germany

[73] Assignee: Robert Bosch GmbH, Stuttgart, Fed. Rep. of Germany

[21] Appl. No.: 765,137

[22] Filed: Feb. 3, 1977

[30] Foreign Application Priority Data

Feb. 7, 1976 [DE] Fed. Rep. of Germany ....... 2604853

[51] Int. Cl.² ............................................ F02M 23/04
[52] U.S. Cl. ...................... 123/124 R; 123/119 DB; 123/119 EC; 123/127; 261/23 A
[58] Field of Search ................. 123/119 DB, 119 EC, 123/124 B, 124 A, 124 R, 119 D, 127; 261/23 A

[56] References Cited
U.S. PATENT DOCUMENTS

| 1,523,234 | 1/1925 | Messier | 123/119 DB |
| 1,544,284 | 6/1925 | Tait | 123/119 DB |
| 2,126,071 | 8/1938 | Weiertz et al. | 123/119 DB |
| 2,553,896 | 5/1951 | Coquille | 123/119 DB |
| 3,190,275 | 6/1965 | Serruys | 123/119 DB |
| 3,374,991 | 3/1968 | Walker | 123/119 DB |
| 3,494,341 | 2/1970 | Serruys | 123/119 DB |
| 3,759,232 | 9/1973 | Wahl et al. | 123/119 DB |
| 4,075,993 | 2/1978 | Bertling | 123/124 R |

Primary Examiner—Wendell E. Burns
Attorney, Agent, or Firm—Edwin E. Greigg

[57] ABSTRACT

A device which influences the composition of the operating mixture supplied to an internal combustion engine having a suction tube and a bypass. The suction tube includes an adjustable mixture quantity control member and the bypass line includes at least one throttle member. Structure is provided to vary the adjustment of the throttle member in proportion to the adjustment of the mixture quantity control member and thereby vary the flow cross section in the bypass. A second throttle member cooperates with the other throttle member and is controlled by a control device connected to the engine to further vary the flow cross section of the bypass. Alternatively, a stylus and cam structure are provided which are utilized to produce the further variance of the flow cross section of the bypass. In this regard the stylus is controlled by the control device.

21 Claims, 6 Drawing Figures

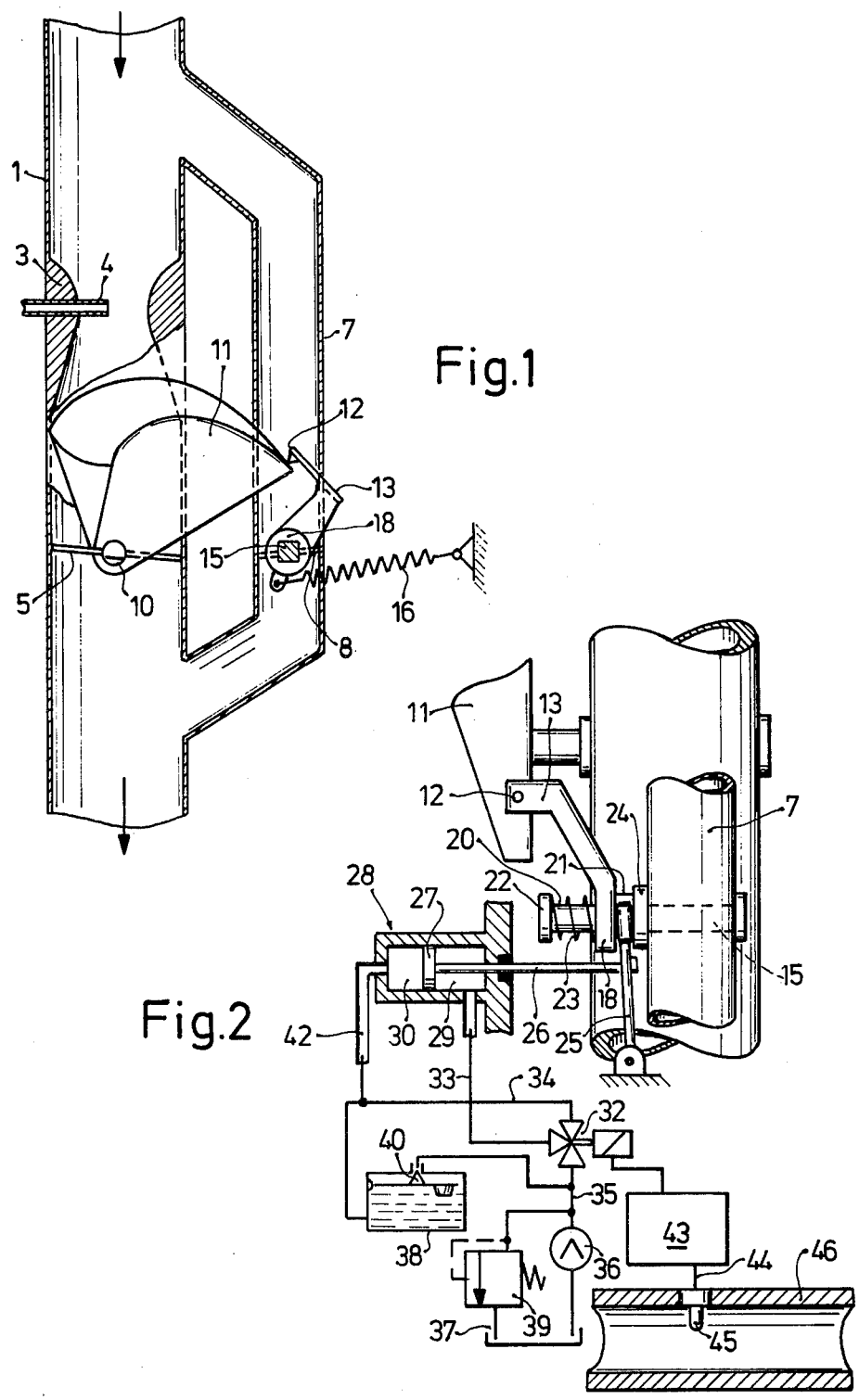

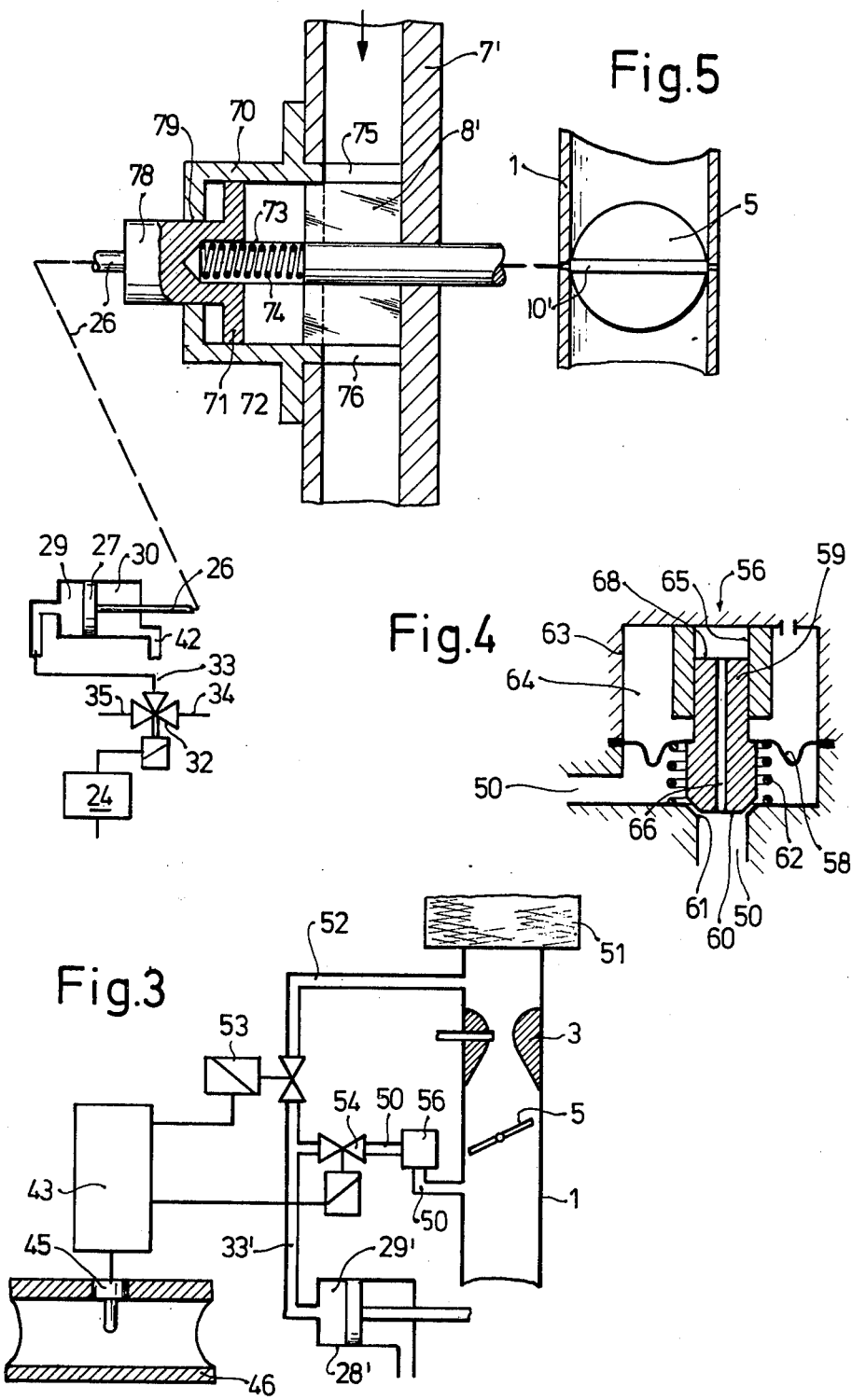

DEVICE FOR INFLUENCING THE COMPOSITION OF THE OPERATING MIXTURE SUPPLIED TO AN INTERNAL COMBUSTION ENGINE

BACKGROUND OF THE INVENTION

The present invention relates to a device for influencing the composition of the operating mixture that is supplied to an internal combustion engine according to a process wherein the gaseous media are supplied via a metering cross section which is variable proportionately to the adjustment of a mixture quantity control member, the proportionality of which is adapted to be influenced multiplicatively between the factor 0 and 1 by a regulating device which determines the operating condition of the internal combustion engine and further comprises a throttle member for determining the metering flow cross section disposed in a line that discharges into the induction tube and a sensing device for transmitting the adjustment of the mixture quantity control device to the throttle member.

In known processes the composition of the fuel-air mixture is influenced by metering a corresponding amount of fuel to the amount of air drawn in by the internal combustion engine. This has the advantage that fuel metering can be controlled much more readily than air metering in that the quantity of fuel introduced tends to be far less influenced by the pressure and temperature. In internal combustion engines whose fuel-air mixture is to be adjusted to specific $\lambda$ values, the dependence of the torque obtained on the amount of fuel introduced is particularly affected when a weak operating mixture and an air value of $\lambda \geqq 1$ are used as in this case the torque change relative to the change in the air value $\lambda$ is especially marked. Modes of operation employing $\lambda \geqq 1$ values are especially advantageous from the point of view of fuel consumption but in this range the above disadvantage affects various modes of control, for example, even when using the idling of the motor as a regulating parameter as fresh torque fluctuations are produced when changing the fuel supply regulated by the idling of the internal combustion engine.

A process has already been proposed wherein the composition of the additional air is dependent on the adjustment of the mixture quantity control member and this dependence is adapted to be influenced multiplicatively between 0 and 1 by a control device determining parameters of the internal combustion engine.

It is also known to influence the fuel-air mixture by supplying additional air but in the known solutions this is carried out either directly as a function of the operating parameters or as a direct function of the main throttle valve (butterfly valve) position in the induction tube. The supplying of additional air to an operating mixture of specific composition which was produced, for example, by a carburetor, has the special advantage—particularly when the mixture is regulated according to the engine idling—that in the lean operating range the change in the amount of air supplied to the mixture compared to the change in the amount of fuel supplied to the mixture produces substantially smaller torque changes and the adjustment/control is not adversely affected by excessive torque fluctuations. Control by additional air is also substantially faster owing to the reduced inertia of the air and because, with this form of metering, the delays, i.e., dead periods, in the control circuit are not as great as with control of the fuel quantity. Moreover, control by the proposed method is rendered substantially more rapid and accurate by a rough influencing operation carried out before the actual control operation, this rough influencing corresponding to the adjustment of the mixture quantity control device with additional multiplicative processing of the transmission between the control device and metering of the additional air.

OBJECT AND SUMMARY OF THE INVENTION

The principal object of the present invention is to produce a device for effecting a proposed process with which more rapid and accurate multiplicative processing is possible using relatively simplified means.

This problem is solved in that for multiplicative influencing of the metering flow cross section of the line a second throttle element is provided for altering the flow cross section of the line at the throttle element, this second throttle element being actuated by a control device determining the operating state of the internal combustion engine.

According to a further advantageous feature of the invention, the throttle element comprises a throttle valve over which is engaged a slotted cylindrical packing element which forms a plunger and constitutes the second throttle element. This plunger fits snugly in the line and is axially displaceable with respect to the throttle shaft by means of an actuator controlled by a control mechanism.

Another advantageous embodiment of the invention provides that the mixture control device includes a main throttle valve disposed within the induction tube wherein the throttle element has a first flat slide which can be slidably displaced by means of an eccentric mounted on the main throttle valve shaft and having a second throttle element which is also a flat slide lying above the first slide and wherein the second slide may be displaced at right angles to the motions of the first flat slide and is also actuated by the actuator controlled by the control mechanism.

These abovementioned embodiments permit, in simple manner, a proportional pre-control of the flow cross section in the line leading to the induction tube and according to the pre-set flow cross section of the main throttle valve in the induction tube. A further advantage deriving therefrom is the multiplicative influence on this metering flow cross section at the same location while maintaining, for example, the existing pressure conditions.

Another aspect of the invention is that there is provided a spatial cam coupled to the fuel mixture control mechanism and disposed between that mechanism and the throttle element. Cooperating with the spatial cam is a spring-loaded cam follower pin connected to the throttle element and serving to displace the latter and capable of displacement at right angles to its own pivotal plane and that of the spatial cam by an actuating mechanism controlled by the control device. This apparatus has the advantage of being simple and compactly constructed and capable of simple attachment to an already existing mixture preparation system.

The invention will be better understood as well as further objects and advantages thereof become more apparent from the ensuing detailed description of exemplary embodiments taken in conjunction with the drawing.

BRIEF DESCRIPTION OF THE DRAWING

FIG. 1 illustrates a first exemplary embodiment of the invention including a spatial cam for controlling a bypass throttle valve;

FIG. 2 is another view of this embodiment of the invention according to FIG. 1, with an actuating device for adjusting the sensing stylus for cooperation with the cam;

FIG. 3 is a schematic view of a pneumatically operated actuating device for the embodiment of the invention shown in FIG. 1;

FIG. 4 shows a detailed view of the pressure control valve according to the embodiment of the invention shown in FIG. 3;

FIG. 5 shows a second embodiment of the invention with a plunger disposed coaxially with respect to the bypass throttle valve.

DESCRIPTION OF THE PREFERRED EMBODIMENTS

Figure 6:
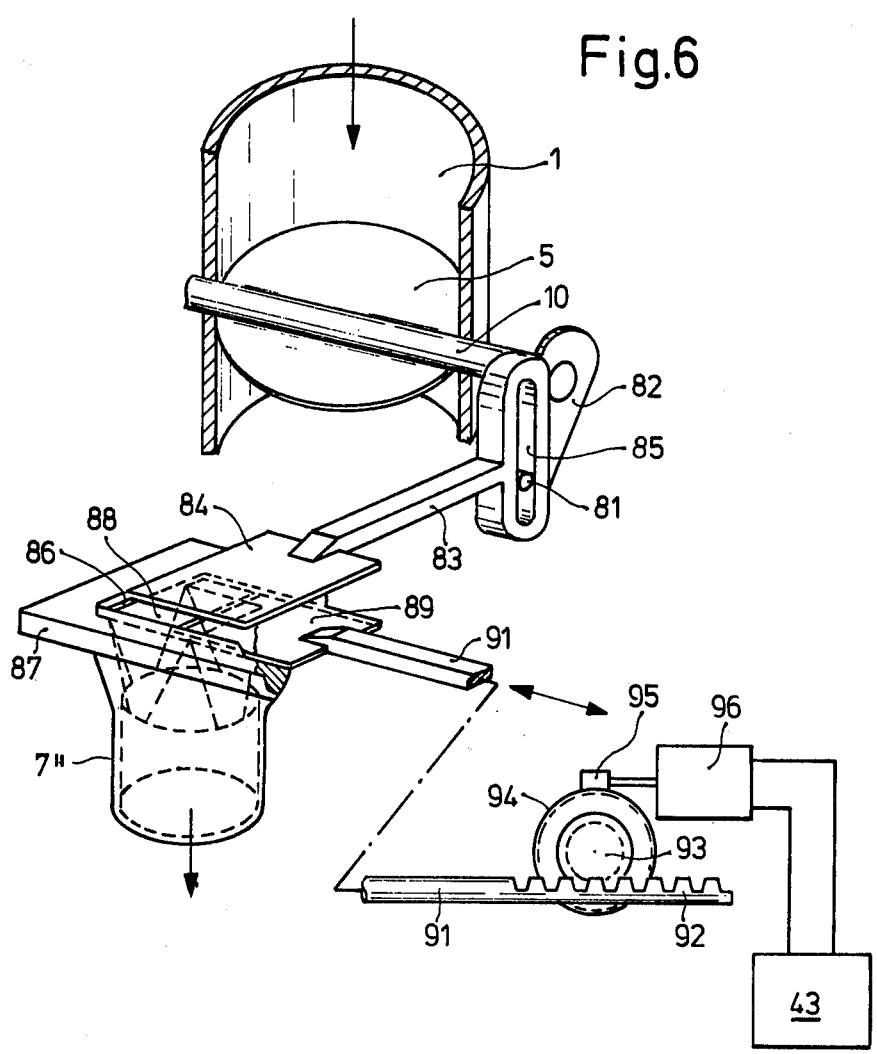
FIG. 6 shows a third embodiment of the invention employing flat slides and electromotively operated multiplicative influencing of the metering cross section of a bypass air line.

FIG. 1 is a diagrammatic view of a part of a suction pipe 1 of a suction system of an internal combustion engine. This suction pipe contains a venturi 3 forming part of a carburetor (not shown). A fuel supply line 4 projects into the narrowest cross section of the venturi. The fuel is supplied to the suction pipe to form the mixture via this fuel supply line 4 in accordance with the pressure in the venturi and the metering cross section of a fuel injection nozzle (not shown). A main throttle valve 5 is disposed downstream of the venturi. The amount of operating mixture supplied to the internal combustion engine can be varied in a conventional manner by means of the valve 5 by varying the flow passage cross section in the suction pipe. In the embodiment shown in FIG. 1 a line 7 is provided as a bypass to the main throttle valve 5. The line 7 contains a further throttle valve 8 whose position influences the quantity of secondary air supplied to the engine via the line 7.

A cam element 11 designed to actuate the throttle valve 8 is attached to the main throttle valve 10. A stylus 12 which forms a portion of a sensing lever 13 is arranged to cooperate with and press against the cam 11. The sensing lever 13 is rigidly connected for rotation with the shaft 15 of the throttle valve 8 and a draw spring 16 is adapted to act on the lever 13 to apply a force on the stylus 12. When the main throttle valve which constitutes the mixture quantity control device is now operated by means (not shown) and the cam 11 is rotated, the stylus 12 follows the curve of the cam disposed in its pivot plane and simultaneously adjusts the throttle valve 8 via the sensing lever 13.

As represented by the feature shown as an example only in FIG. 2, the sensing lever 13 together with the sensing stylus 12 is axially displaceable on the shaft 15 of the throttle valve. Furthermore, as shown in FIG. 2, the hub 18 of the sensing lever 13 is provided with a square opening and is displaceably mounted on a complementally formed part 20 of the throttle valve shaft 15. A pressure spring 23 is disposed between an end shoulder 22 and the sensing lever 13. The pressure spring 23 presses the hub of the sensing lever against a shoulder 24 of the shaft 15 at its exit point from the line 7 and determines the other end position of the sensing lever relative to the position of the cam 11.

The hub 18 includes on its circumference a groove 21 which receives an actuator lever 25 that is arranged for adjusting the sensing lever. This lever 25 is connected to the piston 27 of a servo motor 28 via an actuating rod 26. The servo motor 28 is divided by the piston 27 into a working chamber 29 and a pressure chamber 30. Working pressure is supplied to the working chamber 29 via a pressure line 33 by a three-way magnetic valve 32 which is disposed at the junction of a pressure line 34 and a supply line 35. Both lines supply the valve at a varying and constant fuel pressure and thus a desired mixing pressure can be regulated in the working chamber 29 from between these two starting pressures by virtue of the position of the three-way mixing valve. The supply line 35 constitutes the supply line of a fuel pump which supplies fuel from a fuel container 37 to a float chamber 38 and parallel with which is connected a pressure control valve 39.

The float chamber 38 constitutes one of the usual carburetor float chambers whose supply flow is controlled by a needle valve 40. The pressure line 34 branches off from this float chamber to the three-way magnetic valve 32.

A control device 43 is provided to control the three-way magnetic valve 32. In this embodiment, the control device 43 is connected via the line 44 to a conventional oxygen measuring probe 45 that is disposed in a portion 46 of the exhaust system.

This oxygen measuring probe 45 is of the type which emits a fairly low voltage signal when there is an excess of oxygen in the exhaust gas of the internal combustion engine and a relatively high signal when there is an oxygen deficiency in the exhaust of the internal combustion engine. The transfer between the potentials takes place as a step function in the $\lambda = 1$ range. The three-way magnetic vavle 32 is controlled by the control device 43 according to the voltage signals emitted as control parameters by the oxygen probe and a corresponding mixing pressure is produced in the working chamber 29 of the servo motor. This mixing pressure lies between the supply pressure of the fuel pump 36 and the float chamber pressure. The sensing lever 13 is urged against the force of the spring 23 by the piston 27 via the actuating lever 13 according to the value of the mixing pressure. Thus, it will be understood from the foregoing that this displacement causes a different plane of the cam 11 to be engaged by the sensing stylus 12.

Various arrangements of the position of the throttle valve 8 with respect to the position of the main throttle valve 10 are possible depending on the form of the cam 11. The rotational movement of the cam 11 produces a rough control of the throttle valve 8 and a multiplicative correction, for example, in this case, of the exhaust gas composition, is afforded by the axial displacement of the sensing stylus via the control device 43. Rapid and accurate control is ensured by additional air being supplied independently of the method of producing the mixture through the line 7 of the internal combustion engine downstream of the mixture quantity control device.

The regulating parameter supplied by the oxygen measuring probe 45 can be replaced by a different parameter representing the operating state of the internal combustion engine; this parameter being used to control the control device 43. The idling of the engine can also be used for this purpose. In this case the spread of the pressure variations in the combustion chambers of the internal combustion engine or the torque fluctuation over the rpm fluctuation is determined in a conventional manner by means of a measuring pick-up. It was also proposed to determine the composition of the mixtures to be burned in the combustion chamber of the internal combustion engine by means of ion flow probes and to influence the formation of the mixture by means of the parameters produced by the same. It is also feasible to use as a control parameter the signal probes which pick up an after-reaction of the exhaust gas.

In the embodiment shown in FIG. 2, a continuously adjustable valve was used as the three-way valve 32. With an appropriate lay-out of the control device 43 this valve can be controlled by timed pulses instead of in a similar manner to the control signal. This can be achieved by means of switching pulses which are produced according to the parameter at the same frequency but with a different width and which switch the valve between the "open" and "closed" positions. An electromagnetically operated switching valve which connects the pressure line 33 with either the pressure line 34 or the supply line 35 is more suited to this type of timed control. Compensating volumes can be connected to the pressure line 33 to improve the control performance. Throttles also can be disposed in the lines 34 and 35 to the three-way valve 32.

In place of the above-described hydraulic actuating system it is also possible to employ a pneumatic actuating device for adjusting the sensing lever 13.

Such a system is represented in diagrammatic form in FIG. 3 in which two pneumatic pressures for the actuation of a pneumatic servo motor 28' can be produced without considerable expense in an internal combustion engine. A low-pressure line 50 branches off from the suction pipe 1 downstream of the main throttle valve 5 and the mixture producing device, for example, a carburetor, which is represented schematically by a venturi 3, to the pressure line 33' leading into the working chamber 29' of the servo motor 28'. A pressure line 52 also leads from the suction pipe 1 directly downstream of a schematically represented air filter 51 to the pressure line 33'. In this embodiment, electromagnetic cut-off valves 53 and 54 are disposed in both the low-pressure line 50 and the pressure line 52. The valves are controlled by the control device 43 in phase opposition with a variable pulse width according to the control parameter and a mixed pressure is thus produced from the given starting pressures in the pressure line 33' or in the working chamber 29'.

A pressure control valve 56 is disposed in line 50 between the magnetic valve 54 and the suction pipe so as to obtain a starting pressure of maximum constancy in the low pressure line 50.

FIG. 4 shows the elements of the pressure control valve 56. This is of conventional design and consists of an adjusting membrane 58 to which is attached a closing member 59 whose conical end face 60 is used to control an opening in passage 61. In the opening direction the membrane is influenced by the pressure of the low pressure line 50 which prevails on the suction pipe side and by a pressure spring 62. In the opposite direction the other side of the membrane 58 is acted on by atmospheric pressure in a working chamber 64 enclosed by the membrane in a pressure box 63. Connection to atmospheric pressure is preferably by way of a filter, for example, the air filter 51. The closing member 59 is snugly fitted into a bore 65, as shown. The closing membrane 59 is further provided with a longitudinal bore 66 which provides a connection between the bore 65 and the suction pipe-side section of the low pressure line 50. As a result of this arrangement the surface 68 of the closing member 59 is exposed in the bore 65 to the same pressure as its end face 60 and consequently the closing member is pressure balanced even when very low pressures prevail in the suction pipe.

FIG. 5 shows a second embodiment of this invention. In this embodiment the line 7' is so disposed with respect to the suction pipe 1 that the extended shaft 10' of the main throttle valve 5 simultaneously serves as the throttle valve shaft of a throttle valve 8' disposed in the line 7'. The throttle valve 8' cooperates with the main throttle valve in such a way that when the main throttle valve is closed the throttle valve 8' is also closed. In contrast to the above-described embodiment, the line 7' comprises a rectangular cross section in the region of the throttle valve 8'. A cup-shaped element 70 is inserted into the line 7' coaxially with respect to the throttle valve shaft 10'. A cylindrical plunger 71 is fitted in the cup-shaped element 70. On its side facing towards the throttle valve 8' this plunger comprises a longitudinal slot 72 and a blind bore 73 disposed coaxially with respect to the throttle valve shaft 10. A pressure spring 74 is supported in the blind bore 73 in opposition to the throttle valve shaft 10'. The longitudinal slot 72 and the blind bore 73 conform to the cross section of the throttle valve 8' and the throttle valve shaft 10' in such a way that the plunger can be pushed in a seal-tight manner over the throttle valve 8' until it comes into contact with the opposite wall of the line 7'. In this position the plunger 71 fully closes two openings 75 and 76 provided in the cup-shaped element 70. The openings 75 and 76 correspond to the cross section of the line 7' at this point.

The plunger 71 is actuated by means of a pin 78 which extends through an aperture 79 in the end wall of the cup-shaped element 70.

In this illustrative embodiment of the invention an actuating rod 26 is connected to the pin 78. The piston 27 of a servo motor 28 which is a generally similar structure to that of the servo motor described in connection with the embodiment of the invention shown in FIG. 2 is associated with the other end of the rod 26.

As in the embodiment shown in FIG. 2, the working chamber 29 is supplied via the pressure line 33 with the pressure being regulated by the three-way valve 32. In some cases this pressure can obviously be either the supply pressure supplied to the valve via the line 35 or the float chamber pressure supplied via the line 34. The plunger 71 can be pushed to a greater or lesser extent, according to the pressure engaged in the working chamber 29, over the throttle valve 8' in accordance with the position of the main throttle valve is simultaneously reduced more or less as desired. As soon as the same pressure prevails in the working chamber 29 of the servomotor 28, as that which exists in the pressure chamber 30, the plunger 71 is moved by the pressure spring 74 into its extreme position with respect to the throttle valve 8' and the flow cross section regulated by the throttle valve 8' is completely open.

The different actuating devices and parameters described in relation to FIGS. 2 and 3 also apply in this case. This device has the advantage that it can be very compactly incorporated in an air bypass line. A rapid adjustment can be made with this device through multiplicative variation of the metering cross section of, for example, secondary air supply lines. This change is performed by the exploitation of the pressure drop across the throttle valve 8' which is equal in magnitude to that across the main throttle valve 5.

FIG. 6 shows another embodiment of this invention in which the metering cross section in a line 7" which extends to the suction pipe 1 of the internal combustion engine is varied downstream of the main throttle valve 5. For clarification of the mode of operation of the device only a portion of the suction pipe 1 containing the main throttle valve 5 is represented. The force of rotation of the throttle valve 5 is transmitted to an actuating rod 83 of a flat slide 84 via a pin 81 of a crank 82 that is connected to the throttle valve shaft 10 in such a way that the flat slide 84 executes a longitudinal movement in a plane. The pin 81 of the crank 82 also engages in a longitudinal slot in the actuating rod 83 extending at right angles to the direction of displacement. The flat slide 84 is guided in a close-fitting manner in guide grooves 86 in a flange 87 of the line 7" and determines by its position the cross-sectional area of the passage of an opening 88 in the flange 87. As will become apparent from the following, the opening 88 is adapted to receive several slidable plates. For purposes of clarification and to facilitate comprehension a portion of the flange and also of the complemental upper portion of the extension of the line 7" was omitted in the drawing.

A second flat slide 89 is arranged to lie in the flange 87 in a parallel plane and directly adjacent to the flat slide 84. The slide 89 is also guided in a close-fitting manner in guide means and can be displaced at right angles to the flat slide 84 to further control the same opening 88. An actuating lever 91 as shown in FIG. 6 is in engagement with the second flat slide 89.

In this embodiment of the invention, the actuating lever 91 includes a rack 92. A pinion 93 which is connected to a worm wheel 94 engages in the rack 92. The worm wheel 94 is driven via a worm gear 95 by a reversible electromotor 96 controlled by the control device 43. The electromotor is controlled according to the same principle as the magnetic valves 32 and the cut-off valves 53 and 54 all of which was described earlier. Instead of the hydraulic or pneumatic actuation of the sensing lever 13 or of the plunger 71 as was described in the preceding embodiments, a corresponding adjustment can be made in this case by means of an electromotor. An adjusting magnetic or heatable bi-metallic spring adapted to the particular conditions can also be used as a drive means in place of the electromotor.

As further shown in the embodiment of FIG. 6, the change in size of the flow passage cross section at the suction pipe which occurs during rotation of the main throttle valve 5 is transformed into a proportionate change of the size of flow cross section of the opening 88. The variation of the passage area at the suction pipe corresponds to the expression (1-cosα), represents the opening angle of the throttle valve. Rotation of the throttle valve produces a corresponding variation in the metering cross section of the line 7". This cross section can now be varied multiplicatively by displacing the second flat slide 89 in such a way that the cross-sectional area of the passage is reduced to zero in spite of, for example, a semi-open position of the first flat slide 84.

Instead of the drive means shown in FIG. 6 which consists of a crankpin and longitudinal slide for the flat slide 84 the flat slide can also be adjusted by means of a simple eccentric which cooperates with a spring. Instead of the two flat slides shown in FIG. 6 a combination of a cylindrical element and a flat slide can also be used. The advantage of using two flat slides as represented in this embodiment of this invention is that the flange 87 and the complemental portion of the continuing line 7' can be integrated into a suitably designed throttle valve having a double flange. This offers the advantage of a compact unit which can be used together with conventional carburetors or injection systems measuring air quantities.

In the latter embodiments of the invention described, the line 7" constitutes a secondary air bypass line to the mixture-producing and proportioning device of an internal combustion engine. This line could also be used as an exhaust gas return line for re-cycling the exhaust gases removed from the exhaust gas system of an internal combustion engine and returning them to the suction pipe of the internal combustion engine. It would then be situated downstream of the main throttle valve. Accurate proportioning of the particular quantities and rapid change of the metering cross section according to different operating conditions of the internal combustion engine are also a necessity in the case of exhaust gas re-cycling. The devices described can also be used for this purpose. In this case it will be necessary to adapt the control device to the special conditions of idling and full-load operation.

What is claimed is:

1. In a device for influencing the composition of the operating mixture supplied to an internal combustion engine, comprising:
a suction tube through which the operating mixture of the engine flows as a gaseous medium; an adjustable mixture quantity control member located to define a variable metering cross section in the suction line; a line discharging into the suction tube; first throttle means located to define a metering cross section in the line; and a sensing device for transmitting the adjustment of the adjustable mixture quantity control member to the first throttle means so that the metering cross section in the line can be varied by the first throttle means in proportion to the adjustment of the adjustable mixture quantity control member, which proportionality is adapted to be influenced multiplicatively by a factor of between 0 and 1, the improvement comprising:
second throttle means located for further defining the metering cross section in the line; and control means connected to the second throttle means and to the engine to determine the operating state of the engine, the second throttle means being adjusted by the control means so that the metering cross section in the line can be further varied by a factor of between 0 and 1, and whereby the first throttle means can hold the metering cross section in the line closed independently of the position of the second throttle means.

2. The device as defined in claim 1, wherein the first throttle means comprises: a throttle valve; and a shaft mounting the throttle valve in the line; and wherein the second throttle means comprises: a slotted plunger; and means mounting the slotted plunger so that it can be displaced by the control means axially with respect to the throttle valve shaft into the line with the throttle valve being received within said slot.

3. The device as defined in claim 2, wherein the lines in the region of the throttle valve and the plunger have rectangular cross sections.

4. The device as defined in claim 3, wherein the control means includes an actuating device, a spring, a valve system and a control device, and wherein the actuating device comprises a pneumatic or hydraulic servomotor operating in opposition to the force of the spring, said valve system being controlled by the control device to in turn vary the operating pressure of the servomotor between two adjustment pressures.

5. The device as defined in claim 4, wherein the control means further includes a pressure control valve, wherein means are provided for communicating the pressure in the suction tube upstream of the mixture quantity control member to the valve system as one of the adjustment pressures and further means for communicating the pressure in the suction tube downstream of the mixture quantity control member to the valve system as the other adjustment pressure, and wherein the downstream pressure is stabilized by the pressure control valve before it is communicated to the valve system.

6. The device as defined in claim 4, further comprising a fuel pump, a pressure control valve and a carburetor having a float chamber supplied with fuel by the fuel pump, wherein the supply pressure of the fuel pump is stabilized by the pressure control valve, and wherein the stabilized supply pressure and the float chamber pressure serve as the adjustment pressures.

7. The device as defined in claim 6, wherein the valve system comprises a magnetically operated three-way valve which can be controlled in synchronism or in a timed manner by the control device.

8. The device as defined in claim 6, wherein the valve system comprises a pressure line means and two magnetic valves disposed in the pressure line means for supplying the adjustment pressure, said two magnetic valves being actuatable in phase opposition to one another in the opening time relationship, which is variable by the control device.

9. The device as defined in claim 1, wherein the suction tube includes a mixture producing device upstream of the mixture quantity control member, and wherein the line is an air bypass line bypassing the mixture producing device and the mixture quantity control member.

10. The device as defined in claim 1, wherein the suction tube includes a mixture producing device upstream of the mixture quantity control member, and wherein the line is an exhaust gas return line which branches off from the exhaust gas system of the engine and discharges into the suction tube downstream of the mixture producing device and the mixture quantity control member.

11. The device as defined in claim 1, wherein the mixture quantity control member comprises a main throttle valve mounted by a main shaft in the suction tube, the sensing device comprises an eccentric mounted to the main shaft, the first throttle means comprises a first flat slide mounted in the line and displaceable by the eccentric, the second throttle means comprises a second flat slide mounted in the line over the first flat slide, and the control means includes an actuating device for displacing the second flat slide at right angles to the direction of displacement of the first flat slide.

12. The device defined in claim 11, wherein the actuating device comprises an electromotor which is electromechanically operated.

13. The device as defined in claim 11, wherein the actuating device comprises a proportional electromagnet which is electromechanically operated.

14. The device as defined in claim 11, wherein the actuating device comprises a heated bimetallic spring which is electromechanically operated.

15. In a device for influencing the composition of the operating mixture supplied to an internal combustion engine, comprising: a suction tube through which the operating mixture of the engine flows as a gaseous medium; an adjustable mixture quantity control member located to define a variable metering cross section in the suction line; a line discharging into the suction tube; a throttle member located to define a metering cross section in the line; and a sensing device for transmitting the adjustment of the adjustable mixture quantity control member to the throttle member so that the metering cross section in the line can be varied by the throttle member in proportion to the adjustment of the adjustable mixture quantity control member, which proporionality is adapted to be influenced multiplicatively between the factor 0 and 1, the improvement comprising;

cam means comprising the sensing device, said cam means having a cam coupled to the mixture quantity control member and disposed between the mixture quantity control member and the throttle member, and a spring loaded sensing stylus engageable with the cam and connected to the throttle member for adjustment thereof; and control means including an actuating device and a control device, with the actuating device being connected to the stylus and to the control device, with the control device being connected to the engine to determine the operating state of the engine, and with the stylus being displaceable at right angles to its plane and to the pivot plane of the cam by the control device through the actuating device.

16. The device as defined in claim 15, wherein the mixture quantity control member comprises a main throttle valve, the throttle member comprises a throttle valve mounted in the line by a shaft, and the stylus is mounted to the throttle valve shaft.

17. The device as defined in claim 15, wherein the control means further includes a spring and a valve system, and wherein the actuating device comprises a pneumatic or hydraulic servomotor operating in opposition to the force of the spring, said valve system being controlled by the control device to in turn vary the operating pressure of the servomotor between two adjustment pressures.

18. The device as defined in claim 17, further comprising a fuel pump, a pressure control valve and a carburetor having a float chamber supplied with fuel by the fuel pump, wherein the supply pressure of the fuel pump is stabilized by the pressure control valve, and wherein the stabilized supply pressure and the float chamber pressure serve as the adjustment pressures.

19. The device as defined in claim 17, wherein the valve system comprises a magnetically operated three-way valve which can be controlled in synchronism or in a timed manner by the control device.

20. The device as defined in claim 15, wherein the suction tube includes a mixture producing device upstream of the mixture quantity control member, and wherein the line is an air bypass line bypassing the mixture producing device and the mixture quantity control member.

21. The device as claimed in claim 15, wherein the suction tube includes a mixture producing device upstream of the mixture quantity control member, and wherein the line is an exhaust gas return line which branches off from the exhaust gas system of the engine and discharges into the suction tube downstream of the mixture producing device and the mixture quantity control member.

* * * * *